E. E. SLICK.
GAS ENGINE.
APPLICATION FILED OCT. 26, 1911.

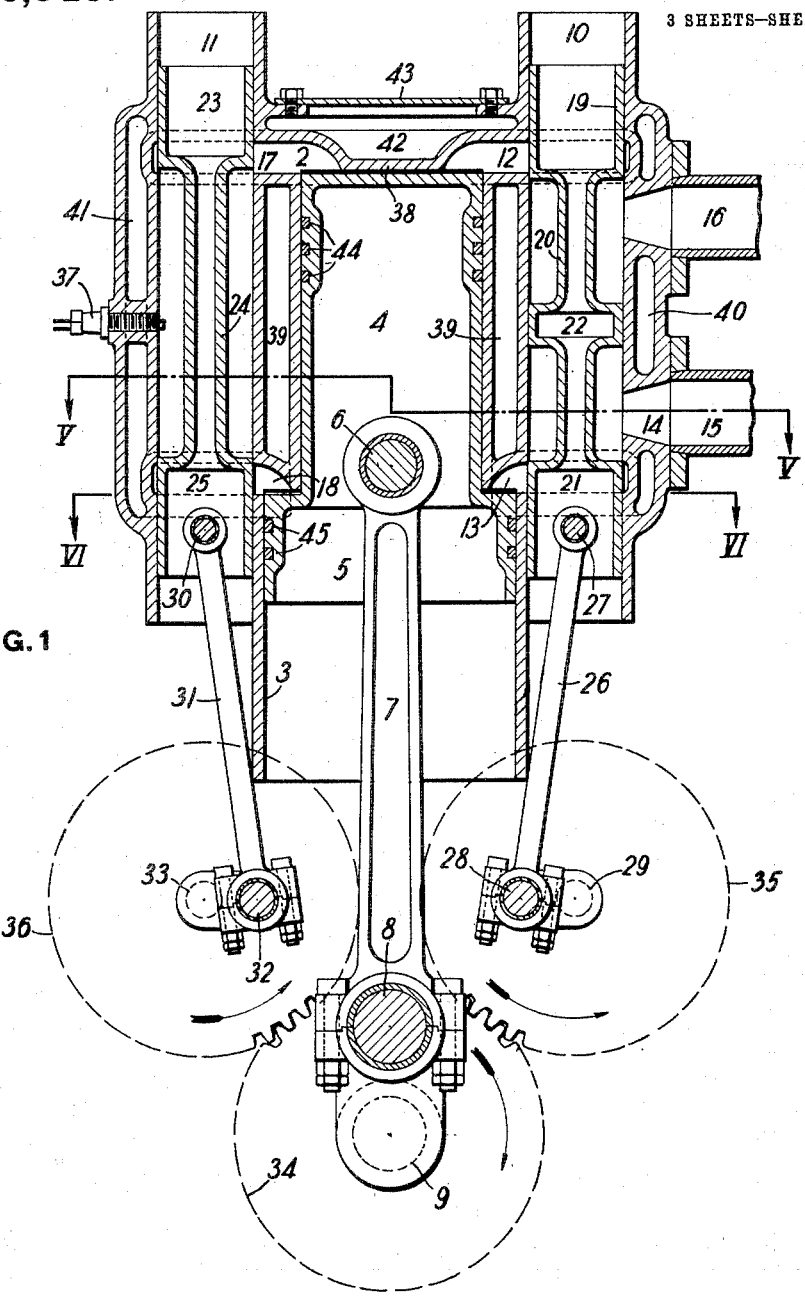

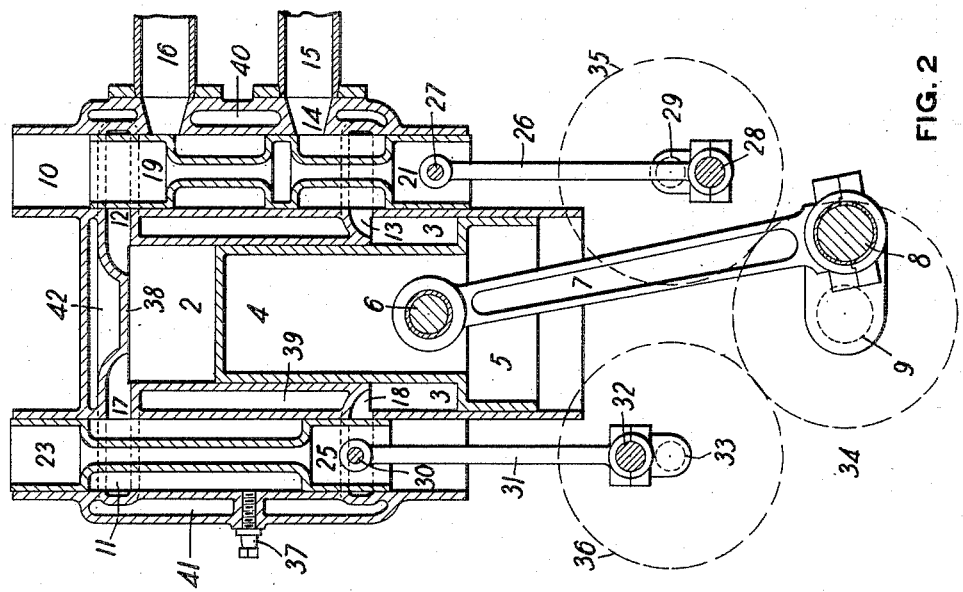
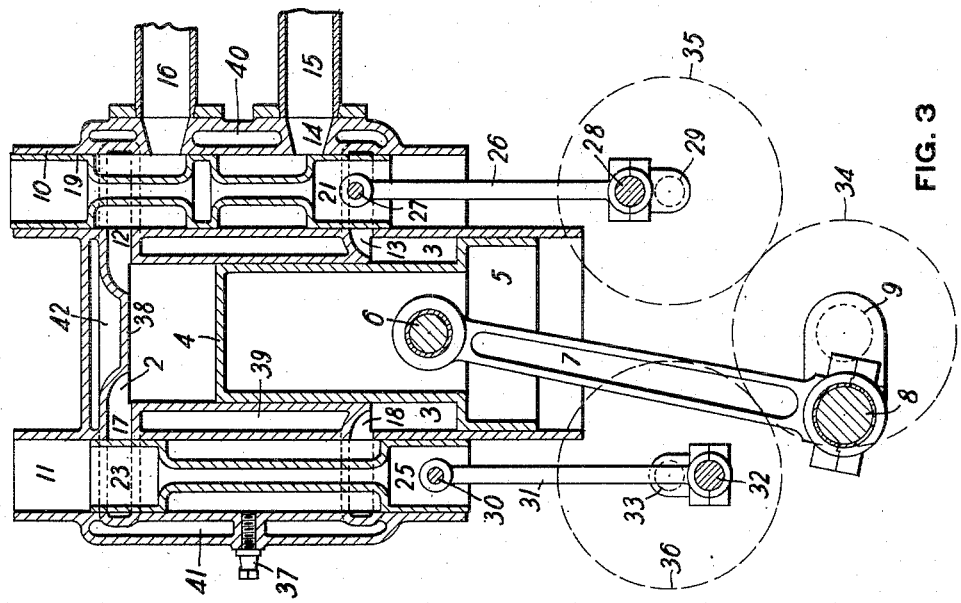

1,076,846.

Patented Oct. 28, 1913.
3 SHEETS—SHEET 3.

WITNESSES

INVENTOR
Edwin E. Slick
by Leuthicum Belts Fuller
his Attorneys.

UNITED STATES PATENT OFFICE.

EDWIN E. SLICK, OF PITTSBURGH, PENNSYLVANIA.

GAS-ENGINE.

1,076,846.  Specification of Letters Patent.  Patented Oct. 28, 1913.

Application filed October 26, 1911. Serial No. 656,953.

*To all whom it may concern:*

Be it known that I, EDWIN E. SLICK, a citizen of the United States, residing at Pittsburgh, in the county of Allegheny and State of Pennsylvania, have invented certain new and useful Improvements in Gas-Engines, of which the following is a specification.

My invention relates to the construction and operation of internal combustion engines, and more particularly relates to the construction and operation of the two-cycle type of such engines.

Heretofore, engines of the two-cycle type have been provided with a large explosion or clearance chamber located on and forming an extension to one end of the engine cylinder. With such construction the incoming charge of fresh gases begins to enter the clearance space before the scavenging stroke is completed. This causes mixing of fresh and burned gases within the clearance space and results in some fresh rich gases being carried out of the clearance chamber with the burned waste gases in each scavenging stroke so as to lessen the strength of the incoming charge and cause a loss in power.

One object of my invention is to provide a two-cycle internal combustion engine of improved construction having novel means whereby the introduction and explosion of compressed gases and scavenging of the engine cylinder are accomplished in as effective a manner as in the four-cycle engine and the power of each explosion stroke equals that of a four-cycle engine cylinder of the same size.

Another object of my invention is to provide a two-cycle internal combustion engine of improved construction having novel means whereby the compression and explosion of the gases and scavenging of the engine cylinder is accomplished in the operation of the engine.

A further object of the invention is to provide a two-cycle engine having improved means for regulating the charge compressing operations, the ignition operations, and the scavenging operations, whereby the burned waste gases are expelled from the expansion cylinder after the expansion of each charge therein.

A further object of this invention is to provide an internal combustion engine having a novel arrangement of valves controlling the supply of gases to and discharge of gases from the engine cylinder, and having improved mechanism for actuating the valves whereby a silent running engine is obtained.

A still further object of my invention is to provide an internal combustion engine having novel means whereby the compressed gases are ignited and are utilized in propelling the piston of the engine.

Figure 4:
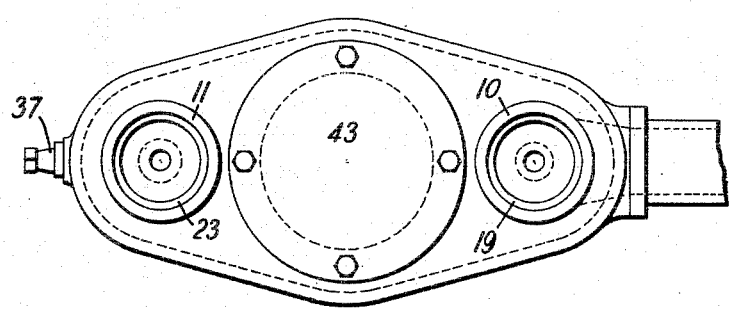
Figure 5:
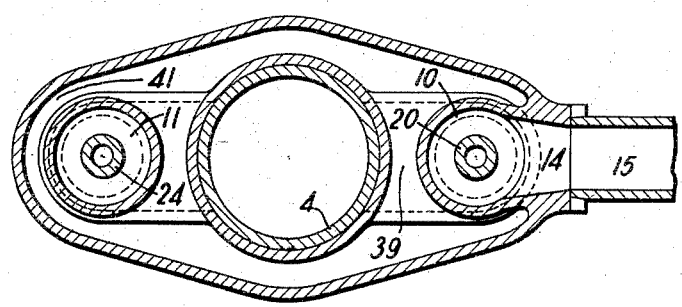
Figure 6:
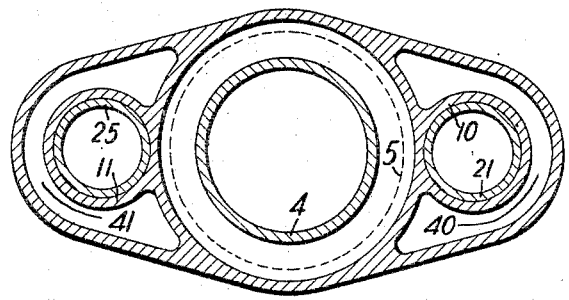

Referring to the accompanying drawings, forming part of this specification, Figure 1 is a longitudinal section through the cylinder and valves of the engine, the valves and the cylinder pistons being in the relative position assumed at the beginning of the outward stroke and also at the completion of the inward stroke of the pistons. Fig. 2 is a similar longitudinal section, on a somewhat smaller scale, showing the relative positions of the valves, the pistons in the expansion and compression cylinders, and the cranks at the time the compressed charges of explosive gases have been fired or exploded and the piston has completed one half of its outward or power stroke. Fig. 3 is a longitudinal section similar to Fig. 2, showing the relative positions of the pistons, the valves, and the cranks, at the beginning of the second half of the inward or scavenging stroke of the expansion cylinder piston, and the simultaneously occurring compression stroke of the piston in the compression cylinder. Fig. 4 is an end view of the apparatus shown in Figs. 1, 2, and 3. Fig. 5 is a transverse section taken on the irregular line V—V of Fig. 1. Fig. 6 is a similar transverse section taken on the line VI—VI of Fig. 1.

In the drawings, 2 designates the expansion cylinder of the engine, and formed integrally on one end thereof is the compression cylinder 3. These cylinders are constructed and arranged to be mounted upon a suitable bed plate or base. The bed plate or base may be formed in any preferred manner and not forming part of this invention is not shown or further described.

The engine cylinder 2 is provided with a trunk piston 4 having an enlarged end forming the piston 5 for the compression cylinder 3. A wrist pin 6 is employed to connect the piston 4, which is hollow, to one end of the connecting rod 7. The opposite end of this rod 7 is secured to the crank pin 8 on the engine crank shaft 9.

Located on opposite sides of the axial center of the expansion cylinder 2 and formed integrally therewith, are valve chambers 10 and 11. The chamber 10 is arranged to form a casing for the valve controlling the exhaust outlet port 12 in the expansion cylinder 2 and the valve controlling the charge inlet port 13 into the compression cylinder 3. The valve chamber 10 is also provided with an inlet opening 14 connected by the pipe or tube 15 to the carbureter for the engine, any preferred form of carbureter being employed. A pipe or tube 16 is employed to lead the exhaust waste gases from the exhaust outlet port 12.

The valve chamber 11, which also forms the explosion chamber, is connected adjacent to one end by the charge inlet port 17 to the explosion cylinder 2, through which the gases lead from the explosion chamber 11 into the explosion cylinder 2. In the opposite end of the chamber 11 is the charge inlet port 18 leading from the compression cylinder 3 into the explosion chamber 11. Mounted within the explosion chamber 11 are the valves controlling the opening and closing of the charge inlet port 18 leading from the compression cylinder 3 into the explosion chamber 11, and of the port 17 which leads from the explosion chamber 11 into the expansion cylinder 2.

The valves are all balanced piston valves as shown herein, and the exhaust valve 19 controlling the cylinder exhaust port 12 is connected by a hollow reduced stem or neck portion 20 with the inlet valve 21 controlling the inlet port 13 to the compression cylinder 3. A cylindrical partition 22 on the neck or stem 20, at an intermediate point in its length, separates the valve 19 from the valve 21 in the chamber 10 so as to separate this chamber into an exhaust outlet port and a charge inlet port. The cylinder inlet valve 23 which controls the opening and closing of the port 17, is also connected by a hollow reduced stem or neck portion 24 with the inlet valve 25 which controls the opening and closing of the port 18 leading from the compression cylinder 3 into the explosion chamber 11.

The annular space formed within the valve chamber 11 by the valves 23 and 25, forms the explosion chamber, into which the compressed charges of explosive gases are led from the compression cylinder 3 in which the charges are fired and from which the fired or exploded gases discharge into the expansion cylinder of the engine.

The valves 19 and 21, which are connected by the integral reduced neck 20, are connected to one end of a connecting rod 26, a wrist pin 27 being employed for this purpose. The opposite end of the connecting rod 26 is connected to the crank pin 28 on the crank shaft 29. The valves 23 and 25 are likewise connected by a wrist pin 30 to one end of a connecting rod 31, and the opposite end of this connecting rod is connected to the crank pin 32 on the crank shaft 33.

A spur gear wheel 34 is provided on the engine crank shaft 9, having teeth meshing with the teeth of similarly formed spur gear wheels 35 and 36 secured on and rotating with the crank shafts 29 and 33, by which the valves are actuated. The gear wheels 34, 35 and 36 are of the same pitch diameter, so that with each revolution of the engine crank shaft 9, the crank shafts 29 and 33 also make entire revolution. A spark plug 37, or a plurality of such spark plugs, is secured in the explosion chamber, preferably being located between the middle of the length of the explosion chamber 11 and the charge inlet port 18 opening into the chamber 11.

It should be noted that in engines constructed in accordance with my invention, there is no clearance space forming an explosion chamber in one end of the engine cylinder, and that there is practically no clearance between the cylinder head and the end of the piston when the piston is fully extended into the engine cylinder. The engine cylinder has a head 38 which is formed integral with the cylinder as shown. The opposite ends of the valve chambers 10 and 11 are hollow and as the valves 19 and 21, 23 and 25, and necks or stems connecting the valves, have a longitudinal opening therethrough, air is freely circulated through the valves so as to cool the valves when the engine is being operated.

The engine cylinder 2 is provided with an encircling annular space 39 forming a water jacket therefor, and the valve chambers 10 and 11 likewise have annular spaces 40 and 41 forming water jackets for the valve chambers. The water jackets on the valve chambers 10 and 11 merge with and connect into the water jacket 39 on the expansion cylinder 2 of the engine, as will readily be seen in Figs. 5 and 6. The head 38 for the cylinder 2 is also provided with a water jacket 42 which communicates with the water jacket 39 on the cylinder and the water jackets 40 and 41 surrounding the valve chambers 10 and 11. A removable cover plate 43 is employed to close the opening into the space in the head forming the water jacket therefor. The piston 4 in the expansion cylinder is provided with the usual packing rings 44 and the piston 5 in the compressor cylinder 3 is also provided with similar packing rings 45.

The operation of my improved gas engine is as follows: The piston 4 in the expansion cylinder 2 and the piston valves 19 and 21, 23 and 25, are operatively connected through the engine crank shaft 9 so that with each backward and forward movement of the reciprocating piston 4, there is a corresponding backward and forward movement of each of the valves 19, 21, 23 and 25. The valves are all set so as to be in closing position when the piston 4 is fully projected into the expansion cylinder 2, as shown in Fig. 1. The parts being positioned as shown in Fig. 1, on the outward movement of the pistons 4 and 5, air is drawn into the compression cylinder 3 through the inlet port 13, which is opened at the beginning of each outward stroke of the pistons. The air in passing into the compression cylinder is passed through a suitable carbureter and becomes mixed with the vapor of a hydro-carbon gas, such as gasolene, so as to form an explosive mixture. On the return or inward stroke of the pistons 4 and 5 the explosive mixture is compressed within the compression cylinder 3 and also within the explosion chamber 11, the inlet port 18 connecting the cylinder and chamber being open during this interval. When the pistons reach the end of their inward stroke the valves 19, 21, 23 and 25, will have again reached the position shown in Fig. 1, and the compressed charge of explosive mixture will have been forced entirely out of the compression cylinder 3 into the explosion chamber 11. The charge of explosive gases in the explosion chamber 11 is then ignited by means of the spark plug 37 in the explosion chamber. At practically the instant the charge is ignited the valve controlling the inlet port 17 from the explosion chamber to the expansion cylinder 2 opens and continues to move from the position shown in Fig. 1 into that shown in Fig. 2. During this time the ignited explosive mixture in the explosion chamber is passing into the cylinder 2 and is propelling the piston outwardly. Simultaneously with or an instant before the opening movement of the valve 23 the valve 25 closes the port connecting the compression cylinder 3 with the explosion chamber 11. The pistons 4 and 5 continue their outward movement resulting from the ignition of the explosive gases. At the same time the valve 23 begins to open, the valve 21 in the valve chamber 10 also begins to open, so as to admit a fresh supply of mixed gases into the compression cylinder 3. Meantime the valve 19 controlling the exhaust port 12 from the engine cylinder 2 remains closed.

During the time the crank shafts 9, 29 and 33 are moving from the position shown in Fig. 2 into the position shown in Fig. 3 the valve 19 controlling the exhaust outlet port 12 in the expansion cylinder 2 is moved into its fully opened position, and the valve 21 is moved from its fully opened position into its closed position, so as to close the supply inlet port 13 in the compression cylinder. At the same time the valve 23 is moved from its fully opened position shown in Fig. 2 into its closed position shown in Fig. 3, and the valve 25 is moved to open the inlet port 18 leading from the compression cylinder 3 to the explosion chamber 11. During the inward or compression stroke of the piston 5 the piston 4 is forcing the exploded or burned gases from the cylinder 2 through the then opened exhaust port 12, so that when the pistons and valves again reach the position shown in Fig. 1 the expansion cylinder 2 has been cleared of waste gases, a fresh charge of an explosive mixture of gases has been compressed within the compression cylinder 3 and explosion chamber 11, and the valves are again positioned in readiness for the charge in the explosion chamber 11 to be again ignited. The above described cycle of operations is then repeated with each revolution of the engine crank shaft in the operation of the engine.

The advantages of my invention will be apparent to those skilled in the art. This invention is applicable to double acting two-cycle engines as well as to the single acting type of engine shown herein.

The novel construction of the engine cylinder and explosion chamber avoids the use of a large clearance space at the end of the cylinder, and the cylinder is effectively cleared of burned waste gases after each exploded or ignited charge is expelled from within the cylinder. By the use of the valve mechanism shown the entrance and discharge of gases into and out of the cylinder are controlled at all times, and the valve operating mechanism shown insures the valves opening and closing and remaining opened and closed at the desired times.

Modifications in the construction and arrangement of the parts may be made without departing from my invention. The type of valve used may be other than the piston valve shown, the actuating mechanism for moving the valves in the manner described may be changed, and other changes may be made within the scope of the appended claims.

I claim:—

1. In an internal combustion engine the combination with an expansion cylinder, an explosion chamber in which the gases are compressed, and a plurality of valve chambers having ports connected to the expansion cylinder, of balanced valves reciprocating in said valve chambers to control the opening and closing of the ports, the valves in one valve chamber co-acting therewith to form the explosion chamber and means for actuating the valves.

2. An internal combustion engine comprising separate compressing and expansion cylinders, unitary pistons operating therein and an explosion chamber in which the charges are compressed, said pistons being constructed and arranged to simultaneously compress the charges within the compressing cylinder and explosion chamber and expel the waste gases from the expansion cylinder.

3. An internal combustion engine comprising tandem compressing and expansion cylinders, tandem pistons operating therein and an explosion chamber in which the charges are compressed, said pistons being constructed and arranged to simultaneously compress charges within the compressing cylinder and explosion chamber and expel waste gases from the expansion cylinder.

4. An internal combustion engine comprising tandem compressing and expansion cylinders, tandem pistons operating therein and an explosion chamber in which the charges are compressed, said pistons being constructed and arranged to simultaneously compress charges within the compressing cylinder and explosion chamber and expel waste gases from the expansion cylinder, and valve controlled ports connecting the explosion chamber with said compressing and expansion cylinders.

5. An internal combustion engine comprising in combination tandem compressing and expansion cylinders having trunk pistons therein, an explosion chamber in which the charges are compressed having ports communicating with the compressing and expansion cylinders, a valve chamber having valve controlled ports connected to the expansion and compressing cylinders, the valves co-acting with said valve chamber to form said explosion chamber, and means for actuating the valves.

6. An internal combustion engine comprising in combination tandem expansion and compressing cylinders having pistons therein, an explosion chamber in which the gases are compressed, a plurality of valve chambers having valve controlled ports connected to the expansion and compressing cylinders, the valves co-acting with one valve chamber coöperating therewith to form said explosion chamber, an engine crank shaft having a connecting rod connected to said pistons, crank shafts having valve operating connecting rods connected to said valves, and gear means operatively connecting said valve operating crank shafts and the engine crank shaft.

7. An internal combustion engine comprising compressing and expansion cylinders, pistons operatively mounted therein, an explosion chamber in which the charges are compressed, and an engine crank shaft, said crank shaft being connected to the pistons to simultaneously compress charges within the compressing cylinder and the explosion chamber and expel waste gases from the expansion cylinder.

In testimony whereof, I have hereunto set my hand.

EDWIN E. SLICK.

Witnesses:
G. W. NEILL,
H. M. CORWIN.